United States Patent [19]

Ansorge et al.

[11] Patent Number: 5,470,474
[45] Date of Patent: Nov. 28, 1995

[54] PROCESS FOR CLEANING HOLLOW FIBERS

[75] Inventors: Wolfgang Ansorge, Essen; Ralf Hornscheidt, Velbert; Andreas Jungheim, Solingen; Klaus Müller, Wuppertal, all of Germany

[73] Assignee: Akzo Nobel NV, Arnhem, Netherlands

[21] Appl. No.: 217,631

[22] Filed: Mar. 25, 1994

[30] Foreign Application Priority Data

Mar. 25, 1993 [DE] Germany ............... 43 09 734.0

[51] Int. Cl.⁶ .................................................. B01D 69/08
[52] U.S. Cl. .................. 210/500.23; 210/411; 210/321.8
[58] Field of Search ........................ 210/634, 500.23, 210/636, 321.8, 411; 264/209.1, 45.9, 41, 49

[56] References Cited

U.S. PATENT DOCUMENTS

| | | | |
|---|---|---|---|
| 4,389,363 | 6/1983 | Molthop | 210/321.8 X |
| 4,540,490 | 9/1985 | Shibata et al. | |
| 4,708,799 | 11/1987 | Gerlach et al. | |
| 4,935,143 | 6/1990 | Kopp et al. | |
| 4,992,221 | 2/1991 | Malon et al. | 210/500.23 X |

FOREIGN PATENT DOCUMENTS

| | | |
|---|---|---|
| 0044405B1 | 1/1982 | European Pat. Off. . |
| 0518653 | 12/1992 | European Pat. Off. . |
| 0587169 | 3/1994 | European Pat. Off. . |
| 0587168 | 3/1994 | European Pat. Off. . |
| 1266921 | 4/1968 | Germany . |
| 7604567 | 11/1977 | Germany . |
| 2652690A1 | 5/1978 | Germany . |
| 2818214 | 10/1979 | Germany . |
| 3004933 | 8/1981 | Germany . |
| 3904513 | 8/1990 | Germany . |
| 289207 | 4/1991 | Germany . |
| 289206 | 4/1991 | Germany . |
| 54-67574 | 5/1979 | Japan . |
| 8402291 | 6/1984 | WIPO . |
| WO85/01449 | 4/1985 | WIPO . |
| 9312161 | 6/1993 | WIPO . |

*Primary Examiner*—Frank Spear
*Attorney, Agent, or Firm*—Oliff & Berridge

[57] ABSTRACT

The invention relates to a process for removing a lumen filler and/or undesired auxiliary processing agents from hollow fibers or hollow fiber membranes by extraction with supercritical gases. The invention likewise relates to the hollow fibers or hollow fiber membranes freed of a lumen filler and/or undesired auxiliary processing agents by this process.

12 Claims, No Drawings

PROCESS FOR CLEANING HOLLOW FIBERS

FIELD OF THE INVENTION

The invention relates to a process for removing a lumen filler and/or undesired auxiliary processing agents from hollow fibers or hollow fiber membranes. The invention likewise relates to the hollow fibers or hollow fiber membranes freed of a lumen filler and/or undesired auxiliary processing agent by this process.

BACKGROUND

Hollow fibers and hollow fiber membranes and their use in the technical or medical area have been known for a long time. Such hollow fibers are produced by known spinning processes, and must always be spun with an internal filler (lumen filler) to stabilize the lumen of the hollow fibers during spinning. This lumen filler can be a gaseous or a liquid substance.

Most commercial hollow fiber membranes are currently manufactured with liquid lumen fillers, especially isopropyl myristate (IPM) or similar compounds to stabilize the lumen.

Because of its insolubility in water and its nontoxic properties, isopropyl myristate is outstandingly suitable as a lumen filler or lumen stabilizer, especially in the manufacture of hollow cellulose fibers which, as is known, are produced in aqueous systems. Isopropyl myristate is also characterized by an advantageous ease of handling. Like all other liquid lumen fillers, the lumen filler must be removed prior to later use of such hollow fibers in the medical and for the most part in the technical area as well. In hollow fibers, especially those used in the medical area (hemodialysis, hemofiltration, sterile filtration, plasmapheresis, etc.) this must be done prior to the pobting procedure of the hollow fibers. Special attention must be given to the fact that the usual pore stabilizer glycerine or other polyalcohols, added in many cases, must not be removed from the membrane. Likewise, other auxiliary agents such as hydrophilizing agents (for example polyvinylpyrrolidone, polyethylene glycol) must not be removed from the membrane, since they contribute to stabilization of the membrane. However, undesired auxiliary processing agents (thickeners, precipitating agents, etc.) must be removed from the finished membrane, since the membrane otherwise cannot be used for the applications for which it is intended.

In addition, the membrane polymer must not be altered chemically and in particular the structure of the membrane must be retained.

Thus far, chlorofluorocarbons such as Freon (R113) or Kaltron have been used to remove internal fillings from hollow fibers (DE-A-28 18 214). These substances result in a washout of the lumen filler used previously, such as isopropyl myristate. However, within the framework of environmental problems (damage to the ozone layer, etc.), it must be assumed that chlorofluorocarbons will no longer be permitted to be used in the foreseeable future. Hence, there is a demand for a substitute which, like chlorofluorocarbons is likewise able to remove the lumen filler from the hollow fibers to such an extent that the residual amount of substances remaining to be removed does not have a negative effect on further processing of the membrane and subsequent use.

Hexane, cyclohexane, N-octane, and various glycerine-alcohol mixtures have been used as alternatives to the chlorofluorocarbons. Apart from the fact that these substances to some extent do not have as powerful a cleaning action as the chlorofluorocarbons, they also have the disadvantage of flammability due to the formation of explosive mixtures with air.

According to DD-A-289 206 and DD-A-289 207, hollow fibers can also be cleaned with water provided the lumen filler used is one that is displaceable by water and the membrane polymer is inert with respect to water.

Flushing hollow fibers with a gas dissolved under pressure in a liquid is described in NL-A-76 04 567 while flushing with gases is discussed in U.S. Pat. No. 4,540,490, U.S. Pat. No. 4,935,143, JP 54067574, and PCT/WO 85 01449. However this process suffers from the disadvantage that it is limited to special lumen fillers and types of hollow fiber.

SUMMARY OF THE INVENTION

One goal of the invention therefore is to provide a method that makes it possible to free hollow fibers (i.e. a hollow fiber bundle or the finished product) of lumen stabilizers (lumen fillers) and/or undesired auxiliary processing agents, as defined above, without chlorofluorocarbons or similar halogen compounds having to be used. Another goal of the invention is to provide a process that avoids the previous disadvantages and environmental problems and which can be used with a wide variety of different types of hollow fibers and kinds of lumen fillers.

These and other goals are achieved by virtue of the hollow fibers or hollow fiber membranes being subjected to extraction with supercritical gases.

DESCRIPTION OF PREFERRED EMBODIMENTS

Taking $CO_2$ as an example, it is a supercritical gas, for example, at a temperature of at least 35° C. and a pressure of more than 74 bars and a density of at least 200 kg/m$^3$ (Römpp Chemie Lexikon, 9th Edition, 1992 (Volume 6), Page 4790, and the references cited therein). Under these conditions, the carbon dioxide is supercritical and has properties completely different from those of normal gaseous or even liquid carbon dioxide. When a particular gas reaches the supercritical point depends on the kind of gas used and the pressure and temperature. Preferably, $CO_2$, $H_2O$, $N_2$, $NH_3$, $N_2O$, $N_2O_2$, $CH_3OH$, $CHF_3$, propane, n-butane, ethylene, toluene, or mixtures thereof are used as supercritical gases for the process according to the invention.

According to another embodiment of the invention, it is also possible to add liquids or solvents to the supercritical gas. Preferably, methanol or water is used.

The process according to the invention can be performed on hollow fibers made of the usual polymers which are not soluble in the extractants or mixtures thereof with solvents or liquids that are used in the supercritical state. Preferred polymers in this connection include but are not limited to cellulose and regenerated cellulose as well as their derivatives such as cellulose acetate or other modifications, polyolefins such as polyethylene and polypropylene, polysulfones such as polyether sulfone, polyacrylonitrile homopolymers and copolymers, polyamides, etc.

The extraction treatment time with the supercritical gas is not critical, and can be between about 1 and 600 minutes, preferably between about 20 and 240 minutes.

According to a preferred embodiment of the invention, a hollow-fiber bundle is extracted. The hollow-fiber bundle contains a plurality of individual hollow fibers, for example 7,000 hollow fibers, but at least 2 hollow fibers.

When $CO_2$ is used as the preferred gas, a pressure of at least 73 bars, preferably at least 100 bars, and a temperature of at least 31° C., preferably at least 40° C. is used.

Preferably the removed lumen filler and/or removed auxiliary processing agents are collected and recycled later.

Another goal of the invention is achieved by a hollow fiber or a hollow fiber membrane in which the lumen filler and/or the undesired auxiliary processing agents are removed using supercritical gases according to the process described herein to result in a hollow fiber or hollow fiber membrane having a residual content of less than 500 ppm isopropyl myristate.

The preferred residual content of isopropyl myristate is below 300 ppm.

The invention will now be described in greater detail with reference to the following examples.

Example 1:

Cuprophan hollow fibers manufactured in the usual fashion with isopropyl myristate as the lumen filler were exposed to the following experimental conditions in an extractor, with $CO_2$ used as the supercritical gas:

Pressure: 100 bars

Temperature: 40°

Extraction Time: 1 hour

The above results in a $CO_2$ density of about 630 kg/m$^3$. After extraction, the hollow fibers have a residual content of only 269 ppm isopropyl myristate, while the glycerine charge remains practically unchanged.

Examples 2 to 6:

The process was conducted as in Example 1 but the processing parameters were varied. The experimental conditions and results obtained are shown in Table 1.

TABLE 1

| Example | Pressure (bar) | Temperature (°C.) | Time (h) | IPM Content, ppm (average) |
|---|---|---|---|---|
| 2 | 350 | 60 | 4 | 81 |
| 3 | 350 | 60 | 8 | 225 |
| 4 | 350 | 80 | 8 | 214 |
| 5 | 350 | 40 | 8 | 362 |
| 6 | 350 | 60 | 8 | 224 |

The glycerine content of the individual hollow fibers and hollow fiber bundles remained practically constant and varied between approximately 95 and 99.5% of the initial value.

The very low isopropyl myristate content and the removal of the other undesired auxiliary processing agents makes the hollow fibers outstandingly suitable for use in medicine.

What is claimed is:

1. A process for removing a lumen filler, undesired auxiliary processing agents, or both from finished hollow fibers or finished hollow fiber membranes, comprising extracting the finished hollow fibers or finished hollow fiber membranes with a supercritical gas.

2. A process according to claim 1 wherein the supercritical gas is selected from the group consisting of $CO_2$, $H_2O$, $N_2$, $NH_3$, $N_2O$, $N_2O_2$, $CH_3OH$, $CHF_3$, n-butane, propane, ethylene, toluene, and mixtures thereof.

3. A process according to claim 1, wherein a liquid or solvent is added to the supercritical gas.

4. A process according to claim 3, wherein said liquid is water.

5. A process according to claim 3, wherein said solvent is methanol.

6. A process according to claim 1, wherein the supercritical gas is allowed to act on the hollow fibers or hollow fiber membranes for a period of about 1 to 600 minutes.

7. A process according to claim 6, wherein said period is about 20 to 240 minutes.

8. A process according to claim 1, wherein said hollow fibers are in the form of a hollow fiber bundle.

9. A process according to claim 1, wherein said extracting step is carried out under a pressure of at least 73 bars and a temperature of at least 31° C., and said supercritical gas is $CO_2$.

10. A process according to claim 9, wherein said pressure is at least 100 bars and said temperature is at least 40° C.

11. A process according to claim 1, further comprising collecting and recycling the lumen filler, the auxiliary processing agents, or both removed from the hollow fiber or hollow fiber membrane.

12. A hollow fiber or hollow fiber membrane, wherein said hollow fiber or hollow fiber membrane has a residual content of lumen filler of less than 500 ppm, said lumen filler comprising isopropyl myristate, wherein said hollow fiber or hollow fiber membrane is produced by a process comprising removing the lumen filler, undesired auxiliary processing agents, or both from a finished hollow fiber or finished hollow fiber membrane by extracting the finished hollow fiber or finished hollow fiber membrane with a supercritical gas.

* * * * *